Patented July 26, 1949

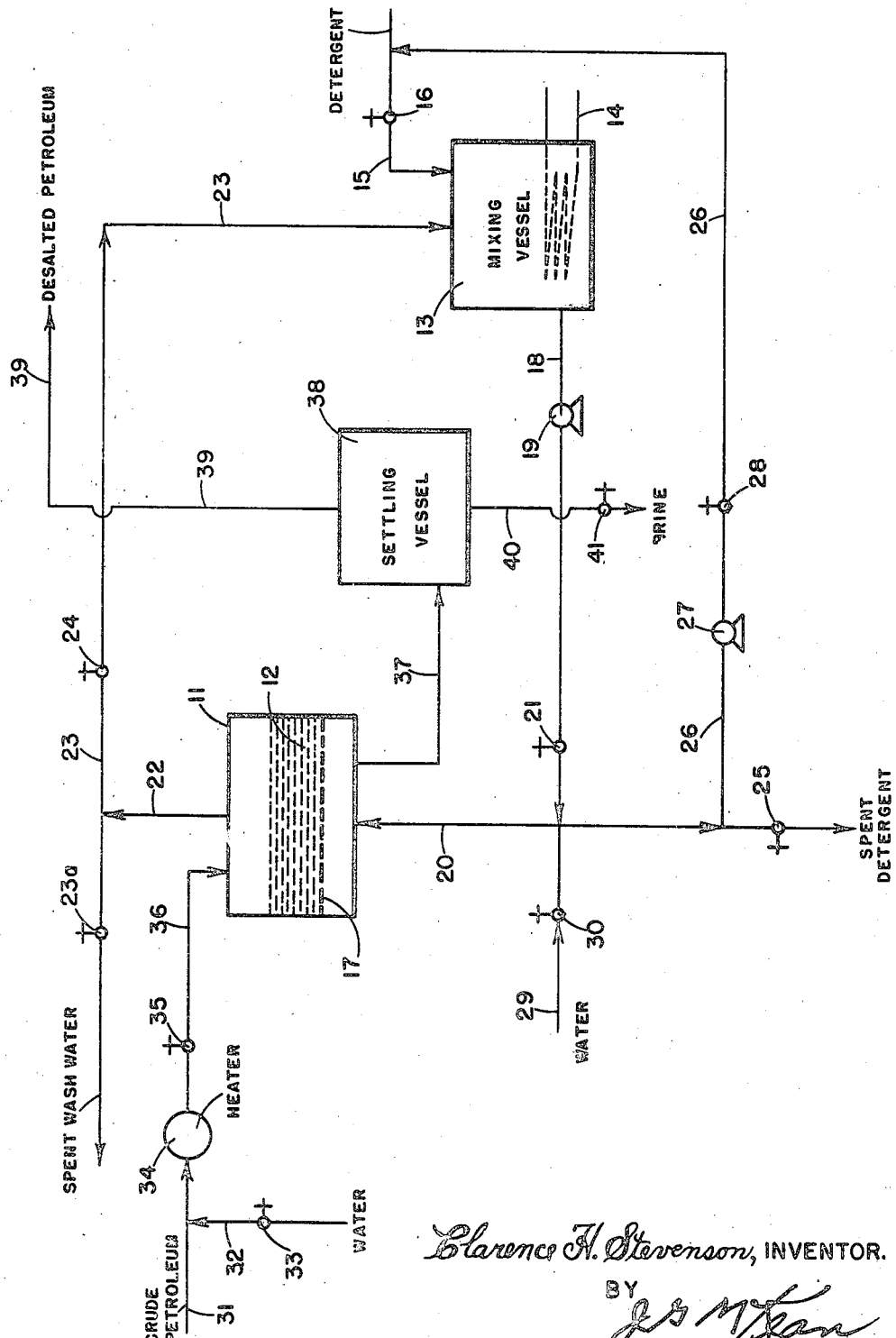

2,477,318

UNITED STATES PATENT OFFICE 2,477,318

TREATMENT OF A HYDROPHILIC COAGULATING SURFACE

Clarence H. Stevenson, Wooster, Tex., assignor, by mesne assignments, to Standard Oil Development Company, Elizabeth, N. J., a corporation of Delaware Application September 22, 1947, Serial No. 775,535

5 Claims. (Cl. 252—324)

The present invention is directed to a method for treating a hydrophilic coagulating surface. More particularly, the invention is concerned with the restoration of the activity of a hydrophilic coagulating surface which has been employed in the resolution of emulsions of hydrocarbons and water. The invention also has to do with a method for desalting crude petroleum.

Crude petroleum as it is produced from subsurface formations usually is associated with various salts of metals. For example, the crude petroleum may have, as it originates from the underground formation, an appreciable content of magnesium chloride, sodium chloride, and the corresponding carbonates and the like. The salts may be present as crystals or may be emulsified with the crude petroleum as droplets of brine in the crude oil. It is a well known fact that crude petroleum ordinarily contains a small amount of brine of the various types and crystals of the salts of sodium chloride, magnesium chloride and the corresponding carbonates, and various other materials. Usually the crystals and/or the droplets of brine may have surrounding them asphaltic bodies which contribute to the formation of tight emulsions of the brine and/or the salt particles in the crude petroleum. When the crude petroleum ultimately reaches the refiners, it is ordinarily subjected to distillation conditions in the presence or absence of steam to allow removal of the valuable gasoline, kerosene, gas oil, and lubricating oil fractions. The temperature conditions are such in the distillation equipment employed that hydrolysis of the salt or salt solution results in the formation of free hydrochloric acid which ultimately destroys the distillation equipment. The formation of hydrochloric acid may be combated by injecting a suitable neutralizing agent into the distillation equipment, but this is not a complete answer to the problem. If the conditions are not suitable for formation of hydrochloric acids, the salts per se may deposit in the fractionation equipment such as bubble cap trays, condensers, and the like and ultimately plug the equipment and make it inoperable. Injection of neutralizing agents such as vaporous ammonia may also result in deposition of salts resulting from the neutralization of the hydrochloric acid similar to the deposition of the salts contained in the crude petroleum. These ammonium salts may also plug the narrow openings in the distillation equipment and cause shut-downs.

The petroleum refiner, therefore, has had recourse to methods for resolving these emulsions of brine and crude petroleum and, therefore, separate the brine from the crude oil and thus reduce the salt content to a reasonable figure where deposition in the distillation equipment does not occur. The petroleum refiner has also deliberately formed emulsions of the crude petroleum with water with the view of the water dissolving the crystals of salts in the crude petroleum which he then coalesced by passing the resulting emulsion through a coagulating bed such as a sand bed, gravel bed, and the like. Some success has attended these operations in which water has been injected into the crude petroleum and an emulsion formed, the emulsion broken and the separated crude petroleum subjected to distillation. However, after the coagulating beds, such as sand or gravel beds, have been used for some time, their ability to resolve these emulsions decreases sharply. Consequently, it has been necessary to replace these beds frequently resulting in shut-down of equipment or provision of a plurality of coagulating beds to make the operation continuous. After the beds have been depleted in ability to coagulate emulsions of crude petroleum and water, the valuable sand and gravel must be discarded or the clogging particles removed from them. The latter is an expensive, tedious operation and frequently the sand and gravel have been dumped and new material provided to form the beds. This constitutes a serious economic loss. It will be well recognized that the provision of a plurality of beds is also an expensive operation especially when the coagulating medium is dumped each time it becomes spent.

It is, therefore, the main object of the present invention to provide a method for restoring the activity of sand or gravel beds which are employed to coagulate emulsions of crude petroleum and water.

It is also an object of the present invention to provide an improved method for desalting crude petroleum.

A still further object of the invention is to treat a hydrophilic coagulating surface to restore its activity in coagulating emulsions which are passed through it.

The objects of the present invention may be achieved by treating a surface which has been employed in coagulating emulsions of water in hydrocarbons with an aqueous solution of a detergent which has the ability to dissolve and/or remove the material which clogs the interstices of beds comprising hydrophilic coagulating surfaces, such as beds of sand or gravel.

Briefly then, the present invention may be described as involving the formation of a mixture of hydrocarbon and water, treatment of the mixture with a hydrophilic coagulating surface such as a bed of sand or gravel to cause the separation of the mixture into a hydrocarbon phase and a water phase, settling the mixture and separately withdrawing said phases, terminating the flow of the mixture to the coagulating bed and soaking and washing the bed in sequence with an aqueous solution of a detergent to cause the removal of material which clogs the pores of the bed. The aqueous solution may be applied in alternate cycles of soaking and circulating.

The type of detergent employed should be a both oil and water soluble detergent such as those produced by the sulfonation of solvent extracts of crude petroleum. The treatment of solvent extracts with sulfuric acid to cause sulfonation of the solvent extract is a well known procedure and the separation of the sulfonated material from the oil phase has been described extensively in the patent literature. Since this is not a part of my invention, a complete description of the production of sulfonates from solvent extracts will not be given. It should suffice to say that the sulfonated petroleum derivative should be both oil and water soluble and more oil soluble than water soluble. Such sulfonated materials are ordinarily termed petroleum sulfonic acids of the mahogany type and are referred to as mahogany acids. The mahogany acids may then be reacted with an alkali metal hydroxide to form the material useful as a detergent in the practice of the present invention. Other predominantly oil soluble but both oil and water soluble detergents are available on the market. As exemplary of the other detergents which may be useful in the practice of the present invention may be mentioned the detergents formed by alkylating aromatic hydrocarbons with olefins followed by sulfonation of the alkylated aromatic derivative and neutralization of the sulfonated derivative with an alkali metal hydroxide. There are many detergents available on the market which may be useful in the practice of the present invention and the following are merely given as exemplary of the type which may be found useful: sulfonated vegetable oils, sulfonated ethers, sulfates of mixed fatty acid mono-glycerides and sulfonated derivatives of the higher alcohols, and the like. These detergents may be termed salts of organic sulfoxy acids or anion-active sulfoxy organic compounds.

The amount of the detergent to be used in restoring the activity of a hydrophilic surface will vary widely depending on the condition of the hydrophilic coagulating surface. Usually, however, it will be desirable to employ, for example, a 10% solution in water of sodium sulfonates of petroleum mahogany acids. Of course, stronger or weaker solutions may be used. A preferred range of solution will range from about 2% to about 20% of detergent in water. It will be apparent to the skilled worker that the strength of the solution may depend on the particular detergent employed in restoring the activity of the hydrophilic coagulating surface.

The surface of a coagulating medium for the separation of a water in oil emulsion must be extremely hydrophilic in order to coalesce the water droplets of the water in oil emulsion. As mentioned before, this property becomes depleted after use of the coagulating surface is made. In accordance with the present invention, this property may be restored by soaking and washing the coagulating medium, for example, sand, in a 10% aqueous solution of a detergent such as sodium sulfonates from mahogany acids at temperatures in the range between 100° to 200° F., then circulating the detergent solution through the bed for a length of time approximately equal the time in which the bed is soaked, the direction of flow of the washing cycle being opposite that employed in the normal operation when the bed is employed to coagulate water in oil type emulsions. After the soaking and circulating cycles are completed, the solution of detergent is withdrawn and the coagulating medium may be washed thoroughly with water to remove the detergent adhering to the particles of sand, for example, making up the bed. This is important since if the residual amount of detergent were not removed, formation of emulsions may be promoted by the presence of the detergent.

The practice of the present invention will be further illustrated by reference to the drawing in which the single figure is a flow diagram of a preferred mode for practicing the present invention.

Referring now to the drawing, numeral 11 designates a vessel of sufficient capacity to provide a coagulating bed 12 to allow resolution of water in oil emulsions. A second vessel 13 containing a heating coil or other heating means 14 is also provided. The vessel 13 may be described as a mixing vessel in which a solution of a detergent, such as sodium sulfonates and water, may be provided. The sodium sulfonates may be introduced into the system as a solution through line 15, controlled by valve 16, or may be introduced as a solid through a hopper, not shown, and water added through line 15 to make up the solution. The solution of detergent in vessel 13 may have its temperature raised to a temperature in the range between 100° to 200° F. by injecting steam into heating coil 14. Assume, for purposes of illustration, that coagulating bed 12 is comprised of a layer of sand and gravel arranged on a grid 17 in vessel 11 and the bed 12 has been used in resolving a water in crude petroleum emulsion. The activity of the bed has been depleted in resolving emulsions of this type, and it is necessary to restore the activity. Under these conditions a solution of sodium sulfonates in water may be withdrawn from vessel 13 by means of line 18 and pump 19 and pumped through line 20 upwardly into vessel 11 to soak the bed 12 for about 30 minutes, depending on the size of the bed 12. During the soaking time of 30 minutes, pump 19 remains inoperative and valve 21 in line 18 is shut. After the bed 12 has been soaked with sodium sulfonate for the prescribed time, valve 21 is open and pump 19 is started again allowing the solution in vessel 13 to be pumped through line 18 and line 20 upward through vessel 11 and bed 12 and discharged by line 22 into line 23, controlled by valve 24 and back into vessel 13 to complete the cycle through the vessel 11 and bed 12 again until about 10 minutes has elapsed. While the soaking time may be greater than the circulating time, it may be preferred to soak and circulate the sodium sulfonate solution for an approximately equal length of time. After the soaking time mentioned, valve 21 is closed, pump 19 is stopped, valve 24 is closed, and valve 25 in line 20 is opened, allowing the contents of vessel 11 to flow by force of gravity down through line 20 and outward from the system. Ordinarily, however, it will be preferred to recover the amount of detergent solution in the vessel 11 remaining after the soaking and circulating cycles and pump it back into vessel 13 by line 26, pump 27, and valve 28. Under these circumstances, valve 25 would be closed. After the sodium sulfonate solution has been withdrawn from vessel 11 and bed 12, valve 21 remains closed and valve 28 is also closed. Fresh water is introduced into the system through line 29, controlled by valve 30 and allowed to circulate through line 29, line 20 through vessel 11, bed 12, and outward through line 22 and line 23, valve 23A being open and valve 24 being closed. The water employed for the washing operation of bed 12 may suitably be recovered or discharged into a sewer, as desired. After the washing operation has been completed, the restored bed 12 may again be used for the resolution of a water in crude petroleum emulsion.

After the restoration of the activity of bed 12 has been completed, vessel 13 and its auxiliary lines are isolated from the vessel 11 and crude petroleum is introduced into the system by line 31 wherein it is admixed with an amount of water sufficient to form an emulsion of water in crude petroleum and to allow desalting thereof. Water is introduced by line 32, controlled by valve 33, and intermingles with the crude petroleum in line 31 and passes through a heater 34 where the temperature of the mixture is raised to 250° F. The formation of an emulsion is favored by passing the heated mixture through a throttling valve or other mixing device 35 and thence, by way of line 36, the emulsion discharges into the vessel 11 and flows downward through bed 12 and thence by line 37 into a settling vessel 38 which provides a sufficient residence time and capacity to allow separation of crude petroleum from the brine originally contained in the crude petroleum and/or resulting from admission of water into the system by line 32. Substantially desalted crude oil may be removed from the top of settling vessel 38 by line 39 and brine may be discharged from the system by line 40, controlled by valve 41.

It will be understood by the skilled worker that it may be desirable to provide a plurality of vessels 11 and 38 to allow continuous operation when one of the plurality of beds is having its reactivity restored in accordance with the present invention. Likewise, it will be apparent to the skilled worker that the brine withdrawn by line 40 from vessel 38 may be admixed with the fresh water introduced into line 31 by way of line 32.

In order to illustrate further the practice of the present invention, the following example is given in which a crude petroleum admixed with water was treated with a sand bed. The crude petroleum was admixed with 2.0 to 2.5 volume percent water and was charged to a coagulating bed comprising sand supported on gravel as a coagulating medium. The crude petroleum admixed with water was charged to the bed at a flow rate of approximately 268 gallons per square foot of cross sectional area of the coagulating bed, and allowed to separate into two phases with the crude oil and brine phases being separately discharged. Analysis of the original crude oil and the crude oil after being treated with the coagulating bed showed a salt content of 46 pounds of salt per one thousand barrels of oil which represented only 25% of the salt present in the original crude as charged. The flow of crude oil in water to the equivalent of bed 12 was then terminated. Crude oil remaining on the sand and gravel was displaced from the bed with water. The bed was then treated in accordance with the present invention by soaking the bed for 30 minutes with an aqueous solution including 10% of a commercial grade sodium sulfonates prepared from mahogany acid obtained from crude petroleum. The bed was soaked for 30 minutes with sodium sulfonates following which sodium sulfonates were circulated through the bed for about 10 minutes. The temperature employed during the soaking cycle was 200° F. while it was approximately 150° F. during the circulating cycle. After this soaking and circulating cycle had been completed, the residual sodium sulfonates were washed with water from the bed and the bed again used in treating a mixture of crude oil and water as described before. After the bed had been treated in accordance with the present invention, the salt content of the crude petroleum was found to be 28 pounds per one thousand barrels, representing only 19% of the original salt content of the crude.

It will thus be evident from the foregoing example that not only does the practice of the present invention allow removal of particles from the bed which may ultimately obstruct the bed, but the treatment results in a material improvement in the ability of the bed to remove brine from the crude petroleum.

The nature and objects of the present invention having been fully described and illustrated, what I wish to claim as new and useful and to secure by Letters Patent is:

1. A method for activating a hydrophilic coagulating surface which comprises forming an aqueous solution of an oil and water soluble detergent which is a salt of an organic sulfoxy acid and which is more oil soluble than water soluble and contacting a hydrophilic coagulating surface with said solution for a time and under conditions sufficient to activate said surface.

2. A method for restoring the activity of a hydrophilic coagulating medium whose activity has been depleted by contact with an emulsion of water and oil which includes the steps of forming an aqueous treating solution including an oil soluble and water soluble detergent which is a salt of an organic sulfoxy acid and which is more oil soluble than water soluble, contacting said coagulating medium with said solution for a time sufficient to saturate the coagulating medium and then flowing the treating solution through said coagulating medium until its activity has been restored.

3. A method for restoring the activity of a bed comprising sand and gravel which has been used in the coagulation of an oil and water emulsion which includes the steps of forming an aqueous solution of a sodium salt of mahogany acids, contacting the coagulating medium with said solution at a temperature in the range between 100° to 200° F. for a time sufficient to saturate the bed with said solution, circulating the solution through said bed, removing the solution from contact with said bed and washing said bed with water.

4. A method for treating an emulsion of water in crude petroleum which comprises flowing an emulsion through a coagulating medium including a bed of sand and gravel, settling the coagulated emulsion and separately recovering an oil phase and a water phase, continuing the flow of said emulsion through said coagulating medium until the latter's coagulating ability is depleted, terminating the flow of emulsion to said coagulating medium, contacting said coagulating medium with an aqueous solution of an oil and water soluble detergent which is a salt of an organic sulfoxy acid and which is more oil soluble than water soluble for a time sufficient to cause saturation of said coagulating medium, flowing said solution through said coagulating medium in a direction opposite the flow of said emulsion, terminating the flow of said solution, washing the coagulating medium with water to remove the detergent solution therefrom and again flowing said emulsion through said coagulating medium.

5. A method for treating an emulsion of water in crude petroleum which comprises flowing said emulsion through a coagulating medium including a bed of sand and gravel, settling the coagulated emulsion and separately recovering an oil phase and a water phase, continuing the flow of said emulsion through said coagulating medium until the latter's coagulating ability is depleted, terminating the flow of emulsion to said coagulating medium, contacting said coagulating medium with an aqueous solution of a sodium salt of mahogany acids at a temperature in the range between 100° and 200° F. for a time sufficient to cause saturation of said coagulating medium by flowing said solution through said coagulating medium in a direction opposite the flow of said emulsion, terminating the flow of said solution, washing the coagulating medium with water to remove the solution of sodium salt of mahogany acids therefrom and again flowing said emulsion through said coagulating medium.

CLARENCE H. STEVENSON.

REFERENCES CITED

The following references are of record in the file of this patent:

UNITED STATES PATENTS

| Number | Name | Date |
|---|---|---|
| 1,480,091 | Meredith | Jan. 8, 1924 |
| 1,596,586 | De Groote | Aug. 17, 1926 |
| 1,769,475 | Teitsworth | July 1, 1930 |
| 1,847,413 | Pollock | Mar. 1, 1932 |
| 1,947,709 | Garrison et al. | Feb. 20, 1934 |
| 2,287,856 | Beekhuis et al. | June 30, 1942 |